United States Patent [19]

Fischbeck

[11] Patent Number: 4,496,960

[45] Date of Patent: Jan. 29, 1985

[54] INK JET EJECTOR UTILIZING CHECK VALVES TO PREVENT AIR INGESTION

[75] Inventor: Kenneth H. Fischbeck, Dallas, Tex.

[73] Assignee: Xerox Corporation, Stamford, Conn.

[21] Appl. No.: 420,449

[22] Filed: Sep. 20, 1982

[51] Int. Cl.[3] .......... G01D 15/16
[52] U.S. Cl. .......... 346/140 R
[58] Field of Search .......... 346/140 PD

[56] References Cited

U.S. PATENT DOCUMENTS

| | | | |
|---|---|---|---|
| 3,787,882 | 1/1974 | Fillmore | 346/75 |
| 3,832,579 | 8/1974 | Arndt | 310/8.1 |
| 3,852,773 | 12/1974 | Sicking | 346/140 PD |
| 4,233,610 | 11/1980 | Fischbeck et al. | 346/140 R |
| 4,347,524 | 8/1982 | Engel et al. | 346/140 R |
| 4,353,078 | 10/1982 | Lee et al. | 346/140 R |
| 4,442,443 | 4/1984 | Martner | 346/140 PD |

OTHER PUBLICATIONS

IBM Tech. Disc. Bull. V26 No. 3A, Aug. 1983, p. 1040.

*Primary Examiner*—E. A. Goldberg
*Assistant Examiner*—Mark Reinhart
*Attorney, Agent, or Firm*—Richard A. Tomlin

[57] ABSTRACT

A pressure pulse drop ejector which incorporates a check valve at both ends of a tubular electromechanical transducer. The transducer is used both to radially squeeze ink through a check valve to an orifice and then by elongating, expressing a droplet from the orifice. The check valves provide the means necessary for preventing air ingestion into the drop ejector.

2 Claims, 4 Drawing Figures

INK JET EJECTOR UTILIZING CHECK VALVES TO PREVENT AIR INGESTION

This invention relates to pressure pulse drop ejectors and particularly to an improved drop-on-demand ink jet printer.

The invention can be utilized in any pressure pulse drop ejector apparatus; however, the greatest benefits are realized when the ejector apparatus of this invention is used in a drop-on-demand ink jet ejector.

In drop-on-demand ink jet operation, ink droplets are emitted only when they are required by the image being formed. To emit droplets, an electrical pulse is applied to an electromechanical transducer, which changes shape, generating a pressure pulse in the ink. The ink is contained in the ejector up to the time of ejection by surface tension forces only. Ink is accordingly normally supplied to a drop-on-demand ink jet ejector by capillary forces or slight gravitational forces only. When the ejector is operating at normal ejection rates in the kHz range, air can be ingested into the ejector through the nozzle. This affects jet operation as is well known and is a major problem in drop-on-demand ejector operation.

The present invention provides a positive pressure on the ink in the ink jet ejector at the time air ingestion could occur, thus reducing air ingestion problems. The invention utilizes two check valves and the movement of the electromechanical transducer to cause ink to fill the nozzle area at all times, not allowing the meniscus of the ink to back into the ink channel far enough to cause air ingestion.

The advantages of the present invention will better be understood on consideration of the following detailed description and particularly when taken in conjunction with the drawing, which shows a preferred embodiment of the present invention. The Figures are not drawn to scale, e.g., the change in electromechanical transducer dimensions has been exaggerated for clarity of understanding.

Figure 1:
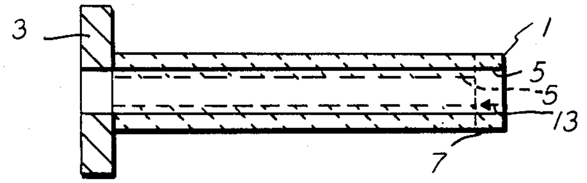
FIG. 1 shows a cross-sectional side view of a tubular electromechanical transducer showing in solid and in dashed lines the effect of an electrical drive pulse on the shape, i.e., thickness of walls and length, of the electromechanical transducer.

Referring now to FIG. 1, there is shown in cross-section a tubular electromechanical transducer 1 bonded to a base plate 3. Electromechanical transducer 1 has conductive inner coating 5 and conductive outer coating 7. Electrical leads 9, 11 (see FIGS. 2–4) are connected to inner conductive coating 5 and outer conductive coating 7, respectively. Application of an electrical pulse can be made between conductive inner coating 5 and conductive outer coating 7, across tubular electromechanical transducer, 1 by connecting a source of potential (not shown) to electrical leads 9, 11. During manufacture, electromechanical transducer 1 is polarized in such a manner that the application of an electrical pulse between conductive coatings 5 and 7 will cause electromechanical transducer 1 to change shape as shown in FIG. 1. At rest, electromechanical transducer 1 conforms to the solid line shape. When a pulse is applied, the transducer walls become thicker radially and shorter along their long axis as shown by the broken lines. The dimensions of the transducer are selected, as is known in the art, so that as the walls thicken during excitation, the outer radius of the transducer tube does not change, but the inner radius diminishes. Base plate 3 is utilized to hold the left end (as shown in the Figures) stationary so that only the right end is free to move in the direction shown by arrow 13. On removal of the pulse, electromechanical transducer 1 reverts to the shape shown in solid lines. It should be pointed out that the pulse can be application of potential or discharge of potential depending on electromechanical transducer 1 properties.

Figure 2:
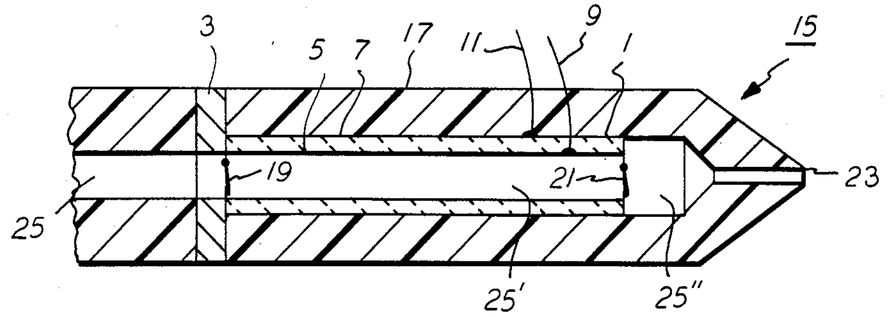
FIG. 2 shows a cross-sectional side view of an ink jet ejector incorporating the check valves of this invention at rest.

Referring now to FIG. 2, there is shown an embodiment for an ink jet ejector shown generically as 15, which incorporates the tubular electromechanical transducer 1 as shown in FIG. 1. Electromechanical transducer 1 and base plate 3 are encapsulated in ink ejector body 17 in such a manner that base plate 3 is rigidly bonded to ink ejector body 17, but electromechanical transducer 1 is supported for slidable movement within ink ejector body 17. An ink containing channel 25 is also provided in ink jet ejector 15. The ends of electromechanical transducer 1 are provided with check valve 19 at the base plate end and check valve 21 at the ink jet ejector orifice end, which check valves 19, 21 are designed to shut off channel 25 as explained below in connection with FIGS. 3 and 4.

Figure 3:
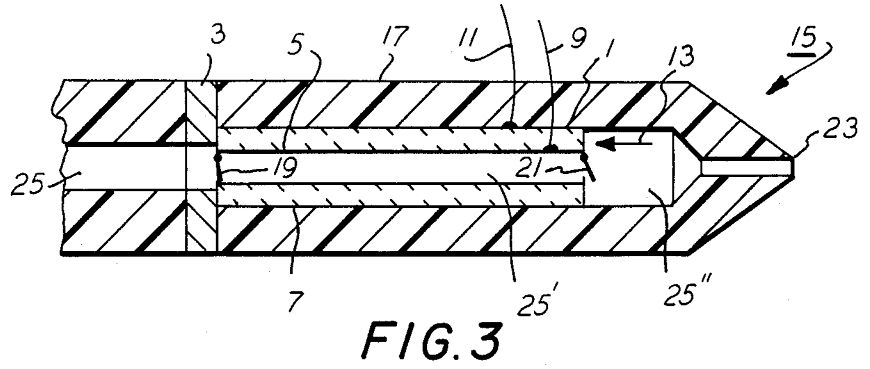
FIG. 3 shows the ink jet ejector of FIG. 2 after a pulse signal has been applied across the walls of the tubular electromechanical transducer.

Referring now to FIG. 3, when a drive pulse is applied to electrical leads 9, 11, the thickness of the electromechanical transducer 1, between conductive inner coating 5 and conductive outer coating 7, increases causing a corresponding decrease in the length of electromechanical transducer 1. The increase in tubular electromechanical transducer 1 wall thickness causes ink contained in ink channel 25' to be compressed. Check valve 19 is designed to close when pressure is applied downstream to ink in ink channel 25' in electromechanical transducer 1. Check valve 21 is designed to open when pressure is applied to ink in ink channel 25' by electromechanical transducer 1. The decrease-in-length movement of electromechanical transducer 1 in effect moves the check valve 21 in the direction shown by arrow 13. Since check valve 21 is open, ink flows through it into ink channel area 25'' between check valve 21 and outlet orifice 23.

Figure 4:
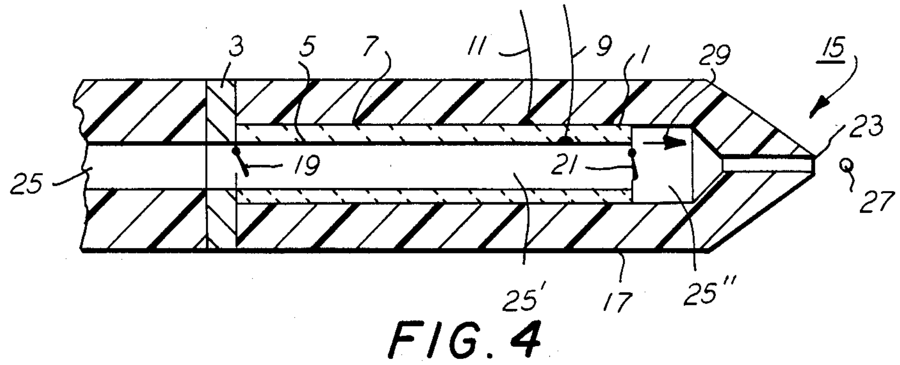
FIG. 4 shows the ink jet ejector of FIG. 2 wherein the pulse signal to the electromechanical transducer has been terminated, and a droplet has been ejected.

Referring now to FIG. 4, on termination of the drive pulse, electromechanical transducer 1 returns to its at rest shape as shown in FIG. 4, with the electromechanical transducer 1 walls being thinner and the electromechanical transducer 1 becoming longer. The reduction of pressure on ink channel 25', caused by the thinning of electromechanical transducer 1 and the lengthening, creates a pressure difference across check valve 19 sufficient to open it, allowing ink to flow into the electromechanical transducer enclosed portion, ink channel 25'. Simultaneously, the lengthening of electromechanical transducer 1 causes check valve 21 to move toward the orifice 23. Electromechanical transducer 1 and check valve 21 thus act as a piston ejecting an ink droplet 27. It can thus be seen that the action of the two check valves keeps ink channel 25' filled from check valve 19 to orifice 23 at all times preventing air ingestion.

Tubular electromechanical transducers 1 are available commercially. Check valves 19, 21 for these electromechanical transducers 1 can be provided as disclosed in copending application (D/82142) entitled "Check Valve for Drop-on-Demand Ink Jet Ejectors". Check valves 19, 21 are, for example, bonded to electromechanical transducer 1 by using an epoxy adhesive.

It can be seen that for each pulse to the electromechanical transducer, ink is first transferred from within the electromechanical transducer 1 through check valve 21 to the ink channel 25″ area between check valve 21 and orifice 23. Then the ink is expressed through orifice 23 by the piston-like action of electromechanical transducer 1 and check valve 21 while simultaneously ink is flowing through check valve 19 into the ink channel 25′ within the electromechanical transducer 1. This two-stage pumping action prevents the establishment of a reduced pressure near the orifice 23 of sufficient magnitude to suck air into the ink channel 25.

Although a specific embodiment and specific components have been described, it will be understood by one skilled in the art that various changes in the form and details may be made therein without departing from the spirit and scope of the invention as defined by the appended claims.

What is claimed is:

1. A pressure pulse drop ejector which comprises:

(a) an ejector body, (b) an ink channel having an exit orifice in said ejector body, (c) a tubular electromechanical transducer surrounding a portion of said channel and mounted for slidable movement within said ejector body, (d) a check valve provided at each end of said electromechanical transducer, and (e) means for holding the end of said electromechanical transducer furthest from said orifice stationary in respect to said orifice.

2. A method of pressure pulse drop ejection from an ejector which comprises:

(a) providing an at-rest tubular electromechanical transducer in operating relationship to an ink channel, said ink channel containing an orifice;

(b) applying a drive pulse to said electromechanical transducer to cause the inner radius of said electromechanical transducer to contract radially and the length of said electromechanical transducer to shorten axially; and (c) removing said drive pulse to said electromechanical transducer to allow said electromechanical transducer to return to its at-rest condition, the movement of said electromechanical transducer to its at-rest condition being used to eject a droplet from said ejector through said orifice.

* * * * *